(12) United States Patent
Yamazaki et al.

(10) Patent No.: US 11,114,916 B2
(45) Date of Patent: Sep. 7, 2021

(54) AXIAL GAP-TYPE ROTARY ELECTRIC MACHINE AND METHOD FOR PRODUCING SAME

(71) Applicant: Hitachi Industrial Equipment Systems Co., Ltd., Tokyo (JP)

(72) Inventors: Katsuyuki Yamazaki, Tokyo (JP); Kenji Uzawa, Tokyo (JP); Shuuichi Takahashi, Tokyo (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 430 days.

(21) Appl. No.: 16/301,125

(22) PCT Filed: Jan. 27, 2017

(86) PCT No.: PCT/JP2017/002875
§ 371 (c)(1),
(2) Date: Nov. 13, 2018

(87) PCT Pub. No.: WO2018/138858
PCT Pub. Date: Aug. 2, 2018

(65) Prior Publication Data
US 2019/0305628 A1    Oct. 3, 2019

(51) Int. Cl.
*H02K 15/12* (2006.01)
*H02K 5/04* (2006.01)
(Continued)

(52) U.S. Cl.
CPC .............. *H02K 5/04* (2013.01); *H02K 1/146* (2013.01); *H02K 21/24* (2013.01)

(58) Field of Classification Search
CPC ................. H02K 1/182; H02K 1/2793; H02K 15/10–15/14; H02K 21/24
See application file for complete search history.

(56) References Cited

U.S. PATENT DOCUMENTS

| | | |
|---|---|---|
| 5,597,523 A | 1/1997 | Sakai et al. |
| 2015/0372544 A1 | 12/2015 | Iwasaki et al. |

(Continued)

FOREIGN PATENT DOCUMENTS

| | | |
|---|---|---|
| JP | 2007-228790 A | 9/2007 |
| WO | WO 2013/121590 A1 | 8/2013 |
| WO | WO 2015/162819 A1 | 10/2015 |

OTHER PUBLICATIONS

Extended European Search Report issued in European Application No. 17894629.9 dated Jul. 21, 2020 (10 pages).

(Continued)

*Primary Examiner* — Ramon M Barrera
(74) *Attorney, Agent, or Firm* — Crowell & Moring LLP

(57) ABSTRACT

The present invention makes full use of the advantages of a resin molded stator while pursuing advantages related to performance, reliability, and workability. Provided is an axial gap-type rotary electric machine comprising: a stator in which a plurality of core units having a magnetic flux surface in the rotational axis direction are arranged annularly around the rotational axis; a rotor facing the magnetic flux surfaces of the stator in the axial direction; a housing comprising an inner cylinder space in which the stator is accommodated; and a molded resin that covers part or all of the stator and integrally connects the stator and the inner circumference of the inner cylinder space. The housing comprises an annular thick wall section that has a predetermined thickness toward the axial center side and that follows the inner circumference in part of the inner circumference of the inner cylinder space. The axial boundary of the molded resin and the inner circumference of the inner cylinder space is included within the area of a radial projection surface of the thick wall section.

6 Claims, 11 Drawing Sheets

(51) Int. Cl.
*H02K 1/14* (2006.01)
*H02K 21/24* (2006.01)

(56) References Cited

U.S. PATENT DOCUMENTS

2015/0380992 A1   12/2015   Enomoto et al.
2017/0126108 A1   5/2017   Tokoi et al.

OTHER PUBLICATIONS

International Search Report (PCT/ISA/210) issued in PCT Application No. PCT/JP2017/002875 dated May 16, 2017 with English translation (two (2) pages).
Japanese-language Written Opinion (PCT/ISA/237) issued in PCT Application No. PCT/JP2017/002875 dated May 16, 2017 (four (4) pages).

AXIAL GAP-TYPE ROTARY ELECTRIC MACHINE AND METHOD FOR PRODUCING SAME

TECHNICAL FIELD

The present invention relates to an axial gap type rotating electric machine, and more particularly, to an axial gap type rotating electric machine having a resin molded stator and to a method for manufacturing the same.

BACKGROUND ART

An axial gap type rotating electric machine has been known. As an example of such an axial gap type rotating electric machine, there is a 2-rotor-1-stator type axial gap type rotating electric machine in which a pair of disk-shaped rotors is arranged to face each other within a rotational axis direction, and a stator is sandwiched between each of the pair of rotors via a gap with a predetermined length in an axial direction. The rotor includes a back yoke as a base member and a plurality of magnets arranged along a rotating direction, and the stator includes a plurality of core units arranged along a rotating direction with a magnetic flux surface as an axial direction.

In addition, in such arranged axial gap type rotating electric machine, the stator is integrally molded with the inner periphery of a housing by a resin, thereby securing insulation or durability or fixing the stator in the housing. Patent Literature 1 discloses an axial gap type rotating electric machine in which a spiral convex portion or a plurality of locking protrusions are arranged in a rotating direction at predetermined intervals on an inner periphery of a housing, a plurality of stator cores are annularly arranged along the inner periphery of the housing on the axial central side, and a resin molded stator integrally is constituted by sealing a resin with the housing and the stator. In Patent Literature 1, it is possible to more reliably fix the stator inside the housing by the convex portion or the locking protrusion.

CITATION LIST

Patent Literature

PATENT LITERATURE 1: International Publication No. WO 2013/121590

SUMMARY OF INVENTION

Technical Problem

Since an axial gap type rotating electric machine can achieve an axis reduction (flat structure) or increase a facing area of a stator/rotor per body, there are advantages that high efficiency can be achieved. In order to maximize these advantages, it is important to manage narrow gaps between the stator and the rotor or to secure airtightness among the components.

When a stator is molded together with the inside of a storage casing such as a housing, there is a possibility that a resin leaks from a gap between the resin mold and the inner periphery of the casing to the rotor side. In particular, from the viewpoint of insulation or the requirement for stable installation of the stator, the sealing pressure of the resin tends to be high, so that the resin also tends to be easily leaked.

There is a possibility that peeling of resin may occur due to vibration during rotation, aging, or the like while leaving resin leaked to the inner periphery of the casing. If the peeled resin pieces penetrate between the gaps, due to such peeled resin, it is considered that damage to a magnetic flux surface or a magnet surface may occur, or other driving parts or the like may be influenced, and problems remain in terms of performance and reliability.

On the other hand, even if the leaked resin is removed after resin sealing and further removing the resin mold, there is also the problem of maintenance that the inner periphery of the casing and the stator surface are damaged due to such a work, or the problem of reduction in workability.

There is a demand for a technology that can pursue the advantages of performance, reliability, and work side while fully exploiting the advantages of a resin molded stator.

Solution to Problem

In order to solve the above-described problem, for example, components described in claims are adopted. That is, an axial gap type rotating electric machine includes: a stator in which a plurality of core units each having a magnetic flux surface in a rotation shaft direction are arranged annularly around a rotational axis; a rotor that faces the magnetic flux surface of the stator in an axial direction; a housing having an inner cylinder space for storing the stator; and a mold resin covering a part or a whole of the stator and integrally connecting the stator and the inner periphery of the inner cylinder space, wherein the housing has an annular thick portion along a part of the inner periphery of the inner cylinder space with a predetermined thickness toward an axial center side along the inner periphery, and an axial boundary between the mold resin and the inner periphery of the inner cylinder space is included in a region of a radial projection plane of the thick portion.

Furthermore, a method for manufacturing an axial gap type rotating electric machine includes: a stator in which a plurality of core units each having a magnetic flux surface in a rotation shaft direction are arranged annularly around a rotational axis; a rotor that faces the magnetic flux surface of the stator in an axial direction; a housing having an inner cylindrical space for storing the stator; and a mold resin covering a part or a whole of the stator and integrally connecting the stator and the inner periphery of the inner cylindrical space, and the method includes: an arranging step of arranging the stator in the inner cylinder space at a position including an axial width of the stator within an axial width of the thick portion; a seal member arranging step of arranging the annular seal member so as to face an axial end portion of the thick portion, the seal member having an inner diameter substantially coinciding with an inner diameter of the axial end portion of the thick portion and having a shape changing in a radial direction by pressing from the axial direction; a pressing step of inserting the resin mold having an outer diameter larger than an inner diameter of the thick portion from an axial opening of the inner cylinder space and pressing the seal member against the axial end portion; and a sealing step of sealing the mold resin from a resin sealing port of the resin mold on the stator side and integrally molding the stator and the inner periphery of the thick portion.

Advantageous Effects of Invention

According to one aspect of the present invention, it is possible to reduce the possibility of peeling of a mold resin toward a rotor side, thereby improving performance, reliability, durability, and workability.

Other problems, configurations, and effects of the present invention become apparent from the following description.

DESCRIPTION OF EMBODIMENTS

Hereinafter, an axial gap type electric motor (hereinafter sometimes simply referred to as "motor") 100 which is an embodiment to which the present invention is applied will be described in detail with reference to the drawings. In the present embodiment, a motor is taken as an example, but the present invention can also be applied to a generator.

Embodiment 1

Figure 1:
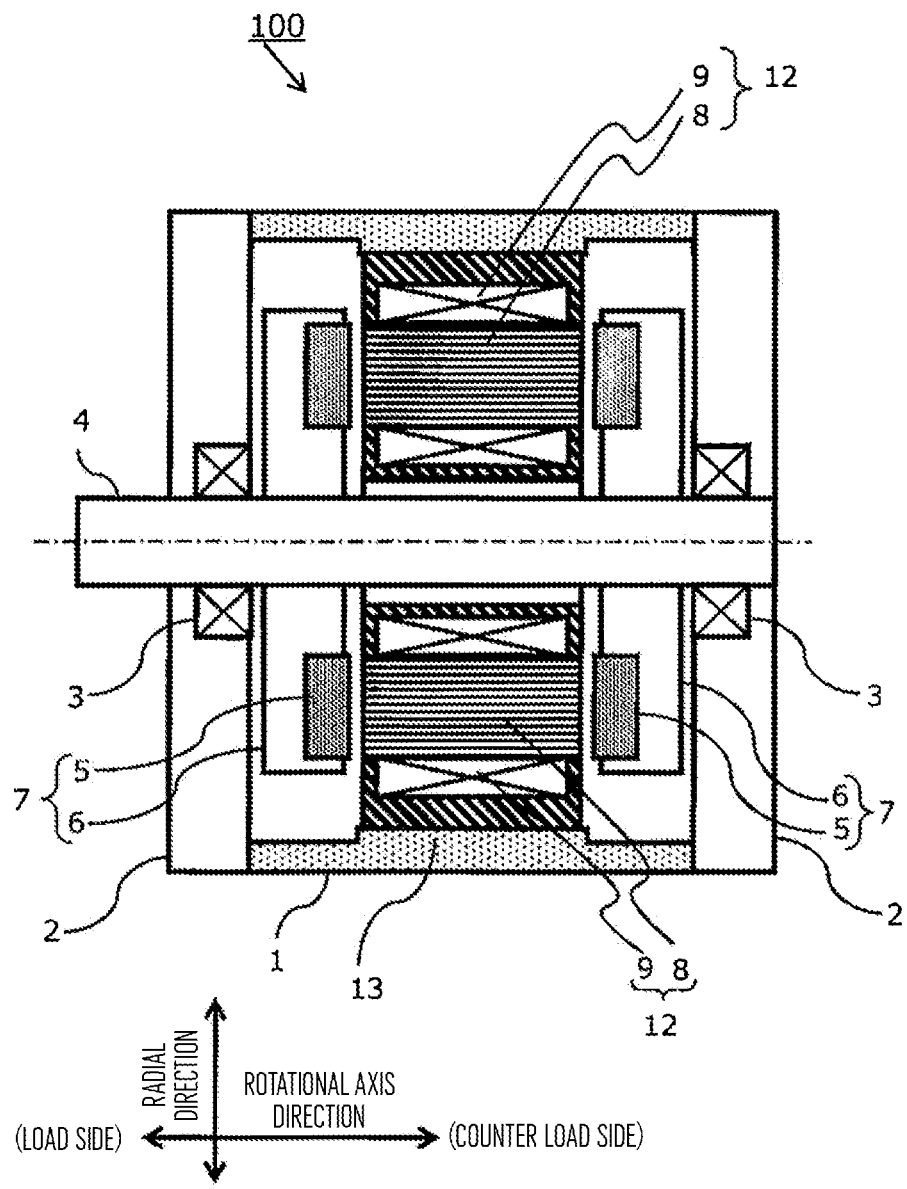
FIG. 1 shows an axial longitudinal sectional view schematically illustrating a configuration of an axial gap type motor according to embodiment 1 to which the present invention is applied.

FIG. 1 schematically illustrates a longitudinal sectional view of the motor 100 in a rotational axis direction. The motor 100 includes a housing 1, a bracket 2, a bearing 3, a rotational shaft 4, a rotor 7, and a stator 12. The housing 1 is a motor housing and is an example of a casing that houses a stator and the like. The housing 1 has a cylindrical shape and has an inner cylinder space that encloses the rotational shaft 4, the rotor 7, and the stator 12.

The rotor 7 includes a disk-shaped back yoke 6 as a base member, and a plurality of (permanent) magnets 5 are arranged on the stator side surface of the back yoke 6. The magnet 5 has various shapes such as a substantially trapezoidal shape or a sector shape and is arranged annularly in the rotating direction around the rotational shaft 4, such that the magnetic poles of the adjacent magnets 5 are different from each other. It should be noted that the magnet 5 may be a single annular body, and adjacent magnet poles within the body may be different from each other when magnetized The back yoke 6 has an axial through-hole in the center and is fixed so as to rotate together with the rotational shaft 4 penetrating the back yoke 6. Two rotors 7 are disposed so as sandwich the stator 12 via a predetermined gap in the axial direction. In the present embodiment, a so-called 1-stator-2-rotor configuration is exemplified, but the present invention is not limited to the number of stators and rotors as far as the purpose is not different.

Both ends of the rotational shaft 4 in the extending direction are rotatably supported by the bracket 2 via the bearing 3 in the radial or thrust direction.

In the stator 12, a plurality of core units 12a having a core 8 or a coil 9 are arranged annularly around the rotational shaft 4. In addition, the stator 12 is a so-called molded stator having a mold resin 10 integrally covering the plurality of core units 12a. Even after the mold resin 10 is arranged, the center of the stator 12 has a hole penetrating in the axial direction such that the rotational shaft 4 penetrates this hole without contact.

In addition, the mold resin 10 also has a function of fixing the stator 12 to the housing 1. The mold resin 10 integrally connects and fixes the stator 12 to the inner cylinder space of the housing 1 by wrapping between the thick portion 13 and the core unit 12a disposed on the inner periphery of the part of the housing 1 to be described later or between the plurality of core units 12a arranged annularly due to the sealing pressure of the sealing device for sealing the resin. The mold resin 10 may cover the whole of the stator 12. For example, various molding modes can be applied, such as exposing a part of the core 8 in the axial direction without covering the same.

The configuration of the core unit 12a and the stator 12 is schematically illustrated in FIG. 2.

Figure 2A:
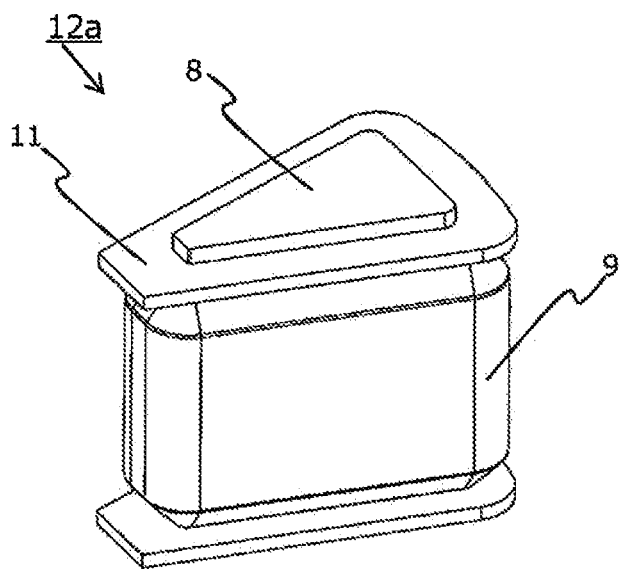
FIGS. 2A and 2B show perspective views schematically illustrating an appearance configuration of a core unit and a stator of the axial gap type motor according to embodiment 1.

FIG. 2(a) illustrates an appearance perspective view of the core unit 12a. The core unit 12a includes a core 8, a bobbin 11, and a coil 9. As the core 8, various configurations such as a laminated core formed by stacking a steel plate or a foil body, a dust core, a core by cutting out, and the like can be applied. The core 8 has a substantially trapezoidal columnar shape. It should be noted that the core may have a configuration other than the trapezoid or the columnar body. The bobbin 11 is an insulating member, and various configurations can be applied. In the present embodiment, a member having a resinous tubular shape is applied. The core 8 is arranged in the inner cylinder of the bobbin 11, and the coil 9 is wound around the outer cylinder of the bobbin 11.

Figure 2B:
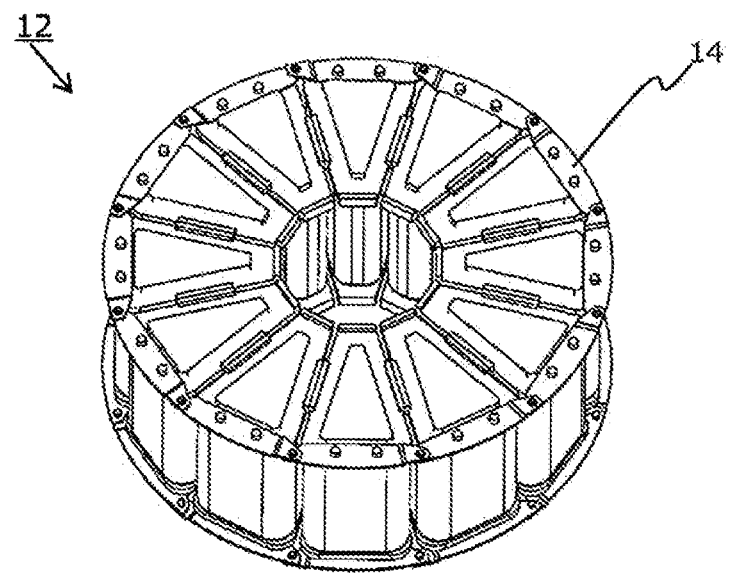

As illustrated in FIG. 2(b), an external perspective view of the stator 12 in which a plurality of core units 12a are annularly arranged is illustrated. In each core unit 12a, the upper base side of each core unit 12a having an approximately trapezoidal cross-sectional shape is annularly arranged to face the rotational shaft 4 side, and each core unit 12a is fastened by the connection member 14 connecting each other on the radially outer periphery of ends of the load side and the counter load side. In the present invention, the configuration of the stator is not limited to this example.

Figure 3A:
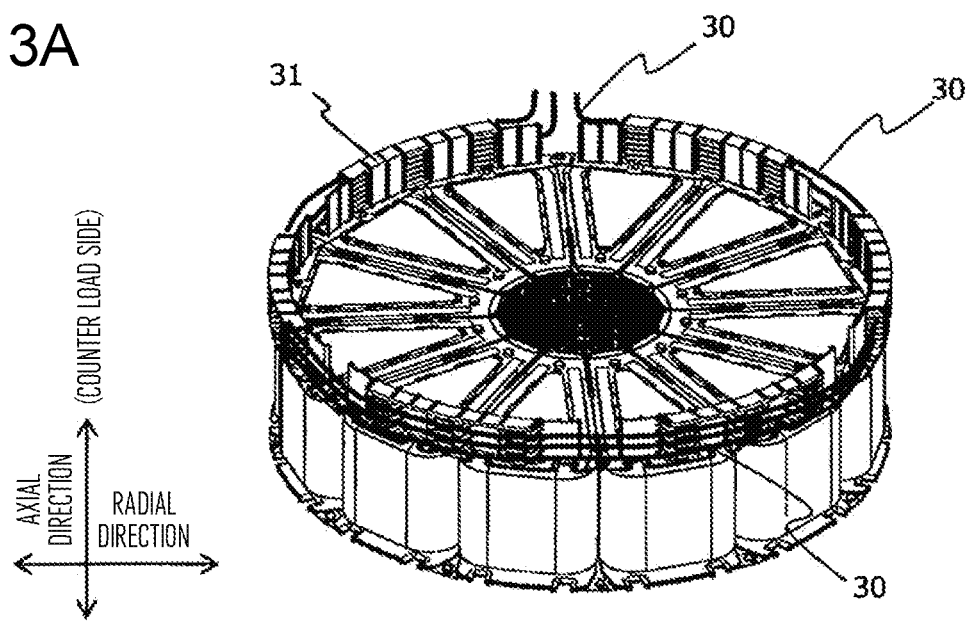
FIGS. 3A and 3B show perspective views schematically illustrating a configuration of a conducting wire of the axial gap type motor according to embodiment 1 and an arrangement configuration in a housing.

FIG. 3 illustrates the stator 12 and the housing on which the stator 12 is arranged. As illustrated in FIG. 3(a), on the periphery of the counter load side of the stator 12, a conducting wire (passing wire) 30 drawn out from each core unit 12a is arranged along the inner peripheral surface of the housing 1. In the present embodiment, three conducting wires 30 are shown, but the present invention is not limited thereto. The conducting wire 30 is held on the inner peripheral surface of the housing 1 by a conducting wire holding member 31 connected to the lower bottom side collar of the bobbin 11.

Figure 3B:
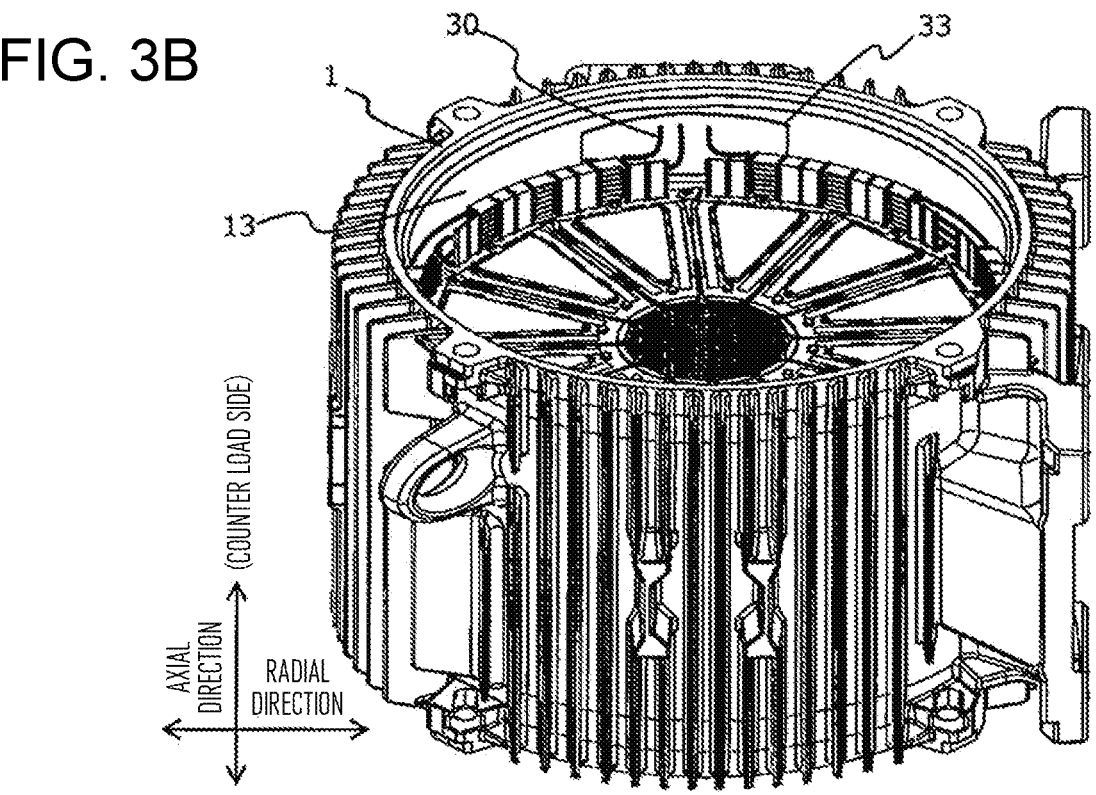

Before sealing the mold resin 10, as illustrated in FIG. 3(b), the stator 12 is arranged within the inner cylinder of the housing 1. The housing 1 has a pull-out port 33 for pulling out the conducting wire 30 to the outside of the housing. The conducting wire 30 arranged along the inner periphery of the housing 1 is guided to the outside from the pull-out port 33 and is connected to a power supply or the like. The number of the pull-out ports 33 may be plural, and the positions thereof are not limited to this example.

While the details will be described later, in the present embodiment, the conducting wire 30 and the conducting wire holding member 31 are also molded on the mold resin 10 together with the stator 12.

Figure 4:
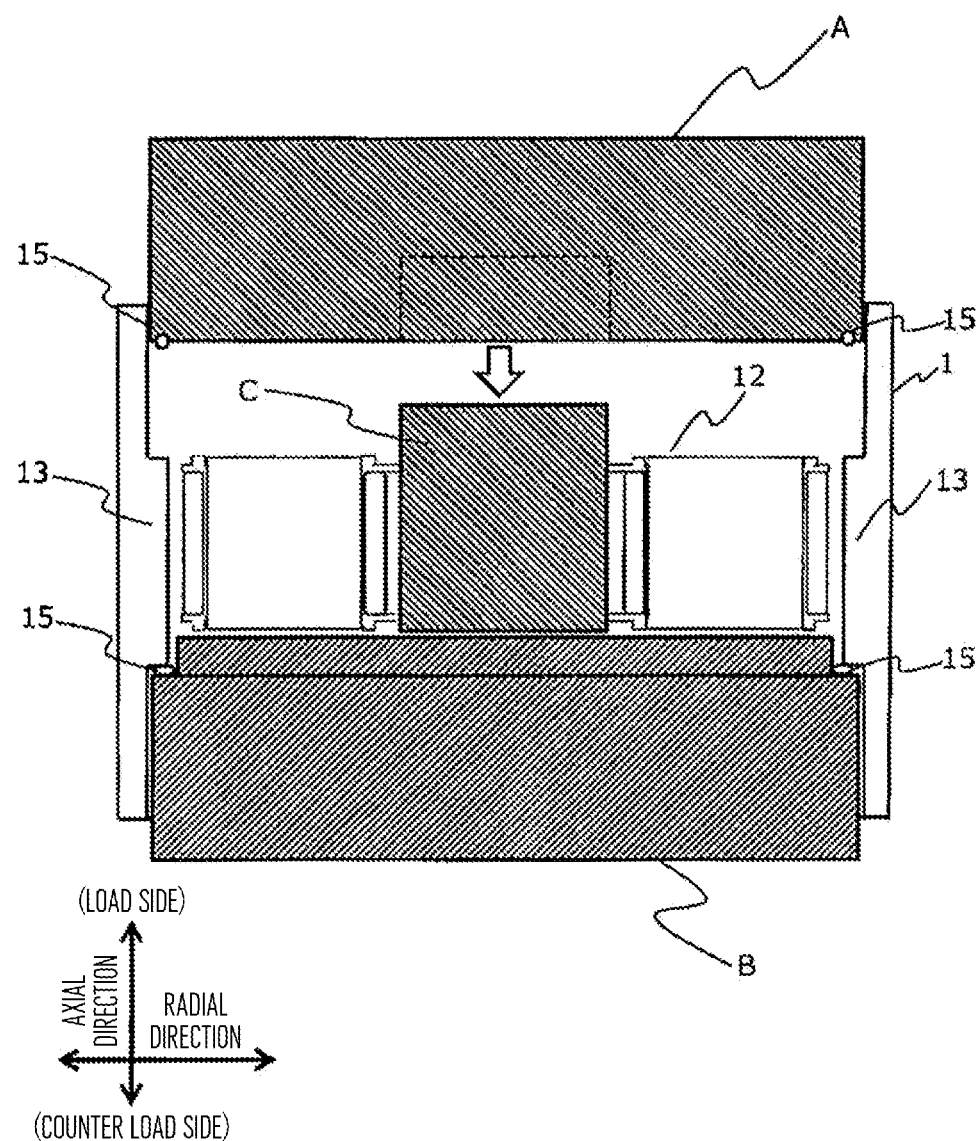
FIG. 4 shows a cross-sectional view schematically illustrating a resin molding process of the axial gap type motor according to embodiment 1.

An example of a process for sealing the mold resin 10 is schematically illustrated in FIG. 4. In FIG. 4, top and bottom (up and down in FIG. 4) are reversed from FIG. 3, and it is described that the upper side of FIG. 4 is the load side. The lower mold B enters the inner cylinder space from the opening on the counter load side of the housing 1, and the stator 12 is disposed in the inner cylinder space of the housing 1. In the middle of the stator 12, a middle mold C is arranged. Next, the upper mold A is inserted into the inner cylinder space from the load side opening of the housing 1, and the stator 12 is positioned in the space surrounded by the inner periphery of the thick portion 13 of the housing 1, the upper mold A, the lower mold B, and the middle mold C.

Here, the stator 12 is positioned within a range of the width of the thick portion 13 of the housing 1 in the axial direction. The thick portion 13 is a portion that has a predetermined thickness in the axial central portion of the inner periphery of the housing 1 and becomes thick toward the axial central side. The thick portion 13 has a shape continuously forming an annular protrusion in the axial direction with the same thickness in the axial direction and the peripheral direction. It should be noted that it is unnecessary for all the regions of the thick portion 13 to occupy the same thickness portion, and a portion of the thick portion 13 may have a concave portion or the like in the outer peripheral direction. As described below, the durability of the housing can be secured with respect to the sealing pressure of the mold resin 10, and the thick portion 13 can be effective as long as it is roughly structured as a continuous portion having the same thickness in the axial direction and the peripheral direction.

In order to secure insulation and durability of the stator 12 and reliably fix within the housing, it is preferable that the resin sufficiently wraps around between the core units 12a and between the core unit 12a and the inner periphery of the housing without any gaps. Therefore, the sealing pressure of the mold resin 10 may become high pressure in some cases. Since it is necessary for the housing 1 to sufficiently withstand the high pressure environment from the inside, the pressure resistance in the radial direction can be secured by having the thick portion 13 in the molded region exposed to high pressure.

The mold resin 10 is sealed in the stator 12 side of the sealing space from the resin-filled holes, not shown, of the upper mold A and the lower mold B. The mold resin 10 wraps between the core units 12a and between a part or the whole of the axial end surface of the core unit 12a or the stator 12 and the thick portion 13 of the housing 1, so as to insulate the stator 12 and fix with the housing 1. After sealing the mold resin 10, the upper mold A, the lower mold B, and the middle mold C are spaced apart in the axial direction.

Here, due to the sealing of the mold resin 10, the stator 12a serves as the molded stator, but there is a possibility that the resin will leak from the gap between the upper mold A or the lower mold B and the inner periphery of the housing 1. From the viewpoint of resin leakage, it is preferable to set the outer diameters of the upper mold A and the lower mold B and the inner diameter of the housing 1 to be as small as possible without gaps, but the problems remain in the accuracy of completely eliminating the gap from the viewpoint of workability and cost. In addition, in terms of stable fixing of the stator 12 and reliability of insulation, as previously described, while there is the case where the sealing pressure of the resin is increased such that the mold resin 10 can be wrapped around the stator 12 and the inner periphery of the housing 1 without a gap, such pressure for sealing the resin also acts to promote resin leakage. It is not preferable from an aspect of the work to peel off the mold resin 10 leaking from the gap after sealing the mold resin. If it is hardened and left to stand, aged deterioration or driving vibration may cause natural peeling and may affect components such as the stator 12 and the rotor 7 or the like.

Therefore, one feature of the present embodiment is that the stator 10 and the mold resin 10 for molding the stator 10 are arranged within the axial width of the thick portion 13 of the housing 1. In other words, the boundary between the inner periphery of the housing 1 and the mold resin 10 in contact therewith is positioned within the axial width of the thick portion 13. In other words, the axial width between the mold resin 10 and the inner periphery of the housing 1 in contact therewith is within the axial width of the thick portion 13, and the contact area in the axial direction of both is within the radial projection plane of the thick portion 13.

A configuration and a means for realizing such a configuration will be described with reference to FIGS. 5 and 6.

Figure 5A:
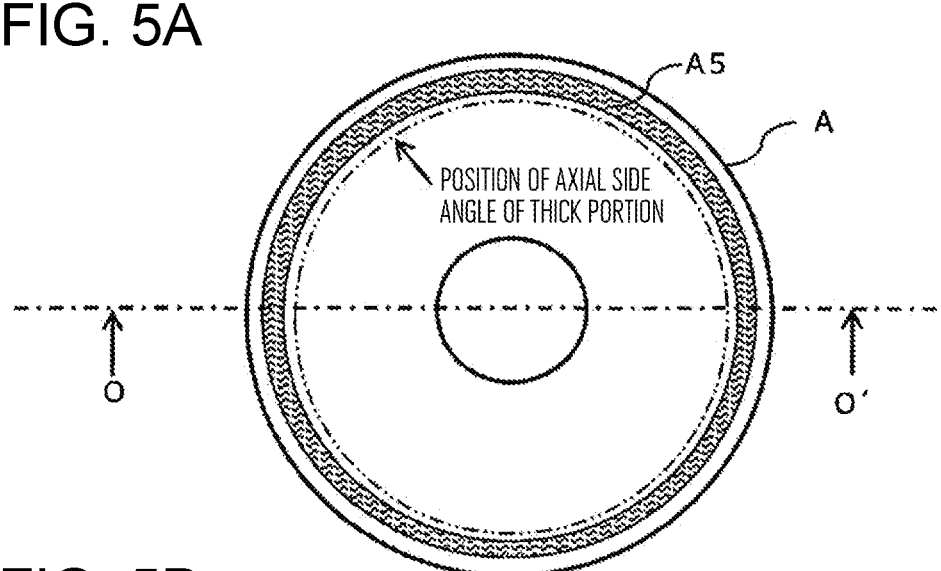
FIGS. 5A to 5C show schematic views illustrating a configuration of a resin mold and a seal member used in the resin molding process according to embodiment 1.

FIG. 5(a) is a front view of the upper mold A observed from the stator 12 side. The upper mold A has an outer diameter slightly smaller than the inner cylinder inner diameter of the housing 1 and also larger than the inner diameter of the thick portion 13. An annular groove A5 (indicated by hatching in the drawing) of a predetermined amount of depth is provided near the outer periphery of the surface facing the stator 10.

Figure 5B:
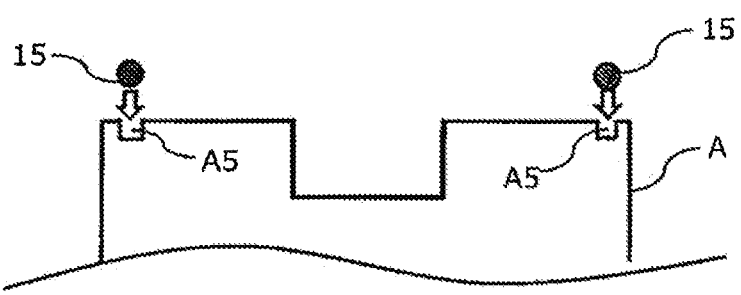
Figure 5C:
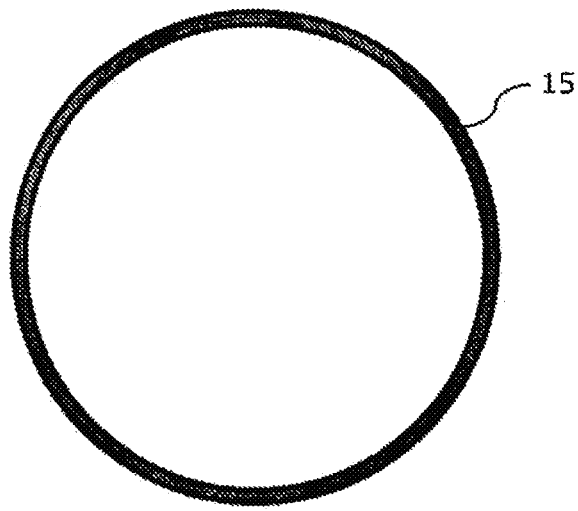

FIG. 5(b) is a schematic cross-sectional view taken along line O-O' in FIG. 5(a). The groove A5 shows a place where the annular seal member 15 is arranged as illustrated in FIG. 5(c). In the present embodiment, the cross-sectional diameter of the seal member 15 is substantially the same as the groove width of the groove A5 or is made larger, and the seal member 15 having been placed in the groove A5 is prevented from falling off from the groove A5 even when the top and bottom of the upper mold A are reversed. In addition, the depth of the groove A5 is smaller than the cross-sectional diameter of the seal member 15. As such, the seal member 15 can be disposed opposite to the axial end surface 13a (step difference surface) of the thick portion 13 described later. Although the cross-sectional shape of the seal member 15 is described as a circle or an ellipse, other shapes such as a rectangle may be used.

The seal member 15 is a member for sealing the abutment surface between the axial end surface 13a of the thick portion 13 of the housing 1 and the upper mold A. The seal member 15 is positioned between the upper mold A which intrudes into the housing 1 and the axial end surface 13a of the thick portion 13 and is deformed by being sandwiched between both and pressed, thereby sufficiently sealing the gap between the thick portion 13 and the abutment surface on the outer peripheral side of the upper mold A. Therefore, it is possible to prevent the mold resin 10 from leaking to the rotor side.

In the present embodiment, while the seal member 15 is described as an elastic member such as rubber or soft resin, the present invention is not limited thereto. For example, a metal, a hard resin, or the like may be applied according to the magnitude of the pressing force between the upper mold A and the thick portion 13 or the material of both. For example, when the upper mold A is stainless steel and the thick portion 13 is iron, aluminum having hardness lower than those of both is applied as the seal member 15. Alternatively, when a metal such as aluminum is used for the seal member 15, it is preferable from the viewpoint of maintenance of the motor 100 that the hardness is lower than that of the material constituting at least the axial end surface 13a.

In this way, while depending on the smoothness of the axial end surface 13a of the thick portion 13 and the abutment surface of the upper mold A, if the condition on the smoothness is permissible, sealing effect can be obtained by deformation of metal such as aluminum by pressing.

In addition, as illustrated in FIG. 5(a) or the like, in the present embodiment, the position of the inner edge of the groove A5 is the same as the position of the axial side angle (two-dot chain line) of the axial end surface 13a by the thick portion 13. The advantages of such a configuration or the like will be described in detail with reference to FIG. 6.

Figure 6A:
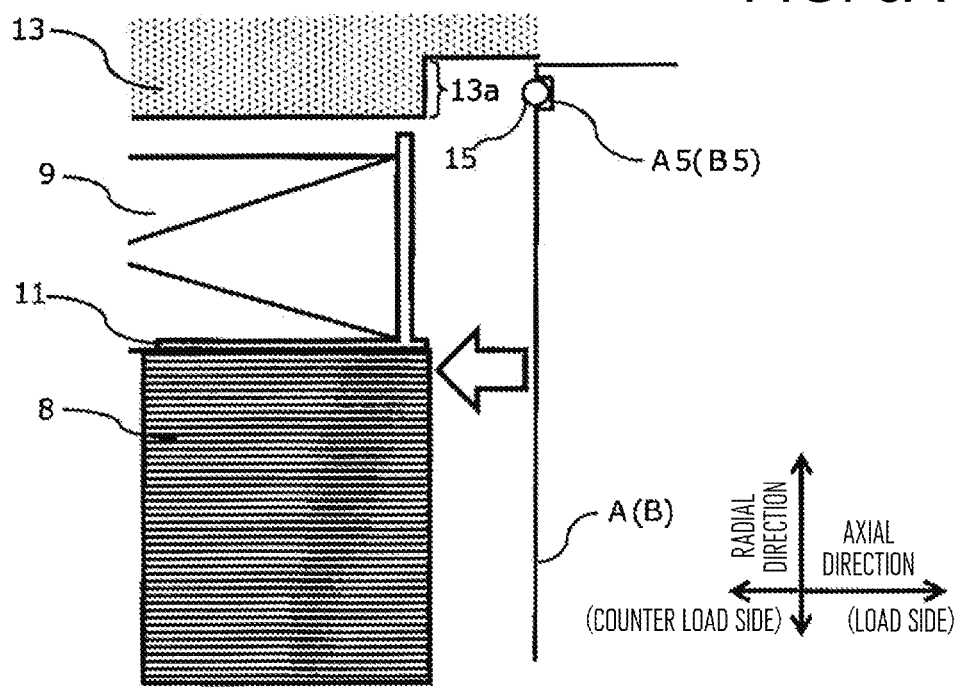
FIGS. 6A and 6B show state transition diagrams schematically illustrating an aspect of deformation of the seal member in the resin molding process of the axial gap type motor according to embodiment 1.
Figure 6B:
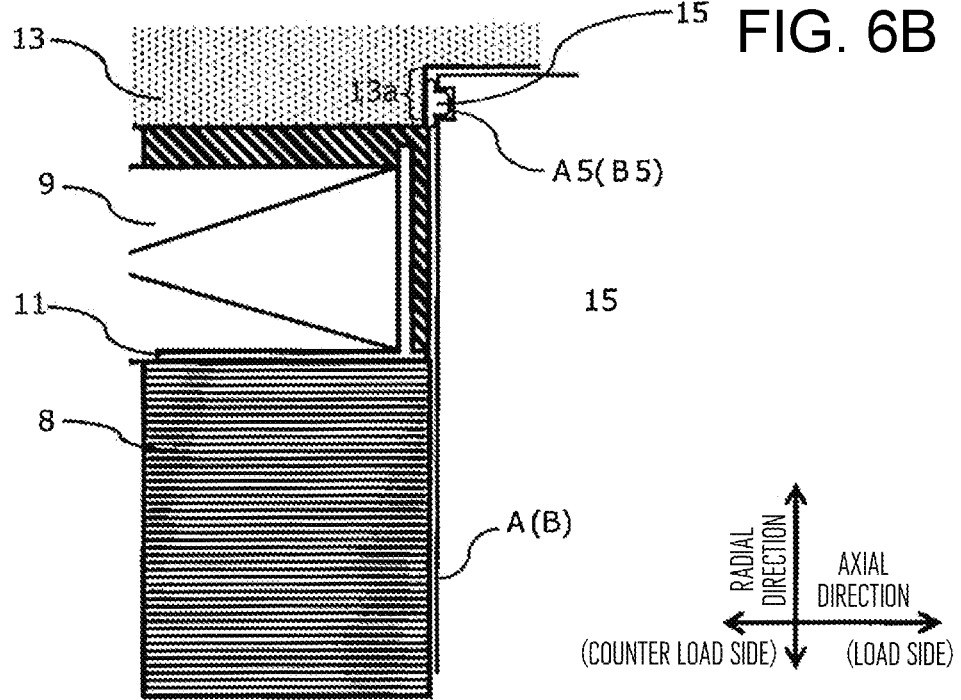

FIG. 6(a) schematically illustrates a state in which the upper mold A enters the housing 1, and FIG. 6(b) schematically illustrates a state transition when the upper mold A and the thick portion 13 abut. As illustrated in FIG. 6(a), the cross-sectional shape is maintained until pressed. As illustrated in FIG. 6(b), the upper mold A and the axial end surface 13a of the thick portion abut and the seal member 15 is deformed by pressing. As described above, the position of the inner edge of the groove A5 is outside the axial side angle of the axial end surface 13a of the thick portion 13. In other words, the pressed and deformed seal member 15 also expands to the axial central side and the enlarged portion is sufficiently pressed in the axial direction by the upper mold A and the axial end surface 13a, such that an increase in the sealing area can be expected.

In addition, the gap is sealed by the seal member 15, but, as the sealing pressure of the mold resin 10 becomes higher, the force for pushing out the seal member 15 toward the outer peripheral side also increases. Furthermore, since a high pressure is also generated between the seal member 15 and the upper mold A, there is a possibility that the resin will leak from such a portion. In this regard, in the present embodiment, since the seal member 15 is held in the groove A of the upper mold A, first, the groove A5 firmly holds the seal member 15, thereby preventing the seal member 15 itself from being pushed out toward the outer peripheral side. Next, a labyrinth structure is formed between the seal member 15 and the groove A5, and such a configuration can prevent the mold resin 10 from leaking between the seal member 15 and the groove A5.

Figure 7:
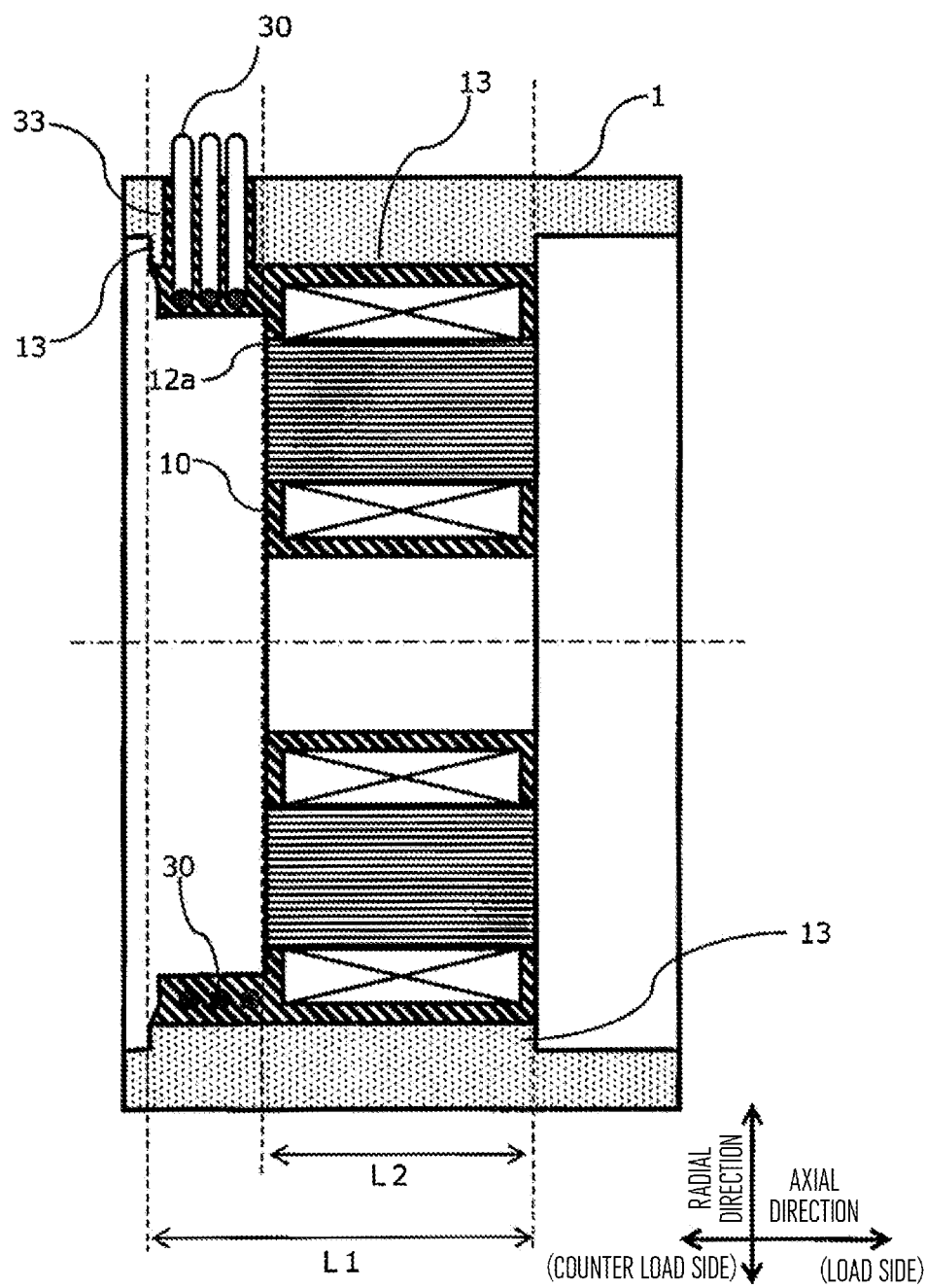
FIG. 7 shows a longitudinal sectional view schematically illustrating the configuration of the axial gap type motor according to embodiment 1 after the resin molding process.

FIG. 7 schematically illustrates a vertical cross-section along the rotational axis direction of the housing 1 of the stator 12 after the mold resin 10 is sealed with removing each mold resin 10. Each of the axial dimensions of the boundary between the mold resin 10 and the thick portion 13 on the load side and on the counter load side is also equal, or the mold resin 10 is shorter. That is, the sealing action by the axial end surface 13a of the thick portion, the seal member 15, or the like is to prevent resin leakage toward the rotor 7 side. Therefore, the performance and reliability of the motor 100 are improved, and the process of peeling the leaking resin does not occur.

Further, the axial width L1 of the thick portion 13 is equal to or larger than the axial width L2 of the stator 12. That is, the housing 13 can obtain sufficient pressure resistance against the pressure at the time of press-fitting the mold resin 10. Wrapping around the mold resin 10 with high density greatly contributes to insulation and durability of the motor 100. This effect can be realized by having the thick portion 13 at a portion to which at least a high pressure (especially high pressure in the radial direction) load is applied. Making the thickness of only the high pressure load portion thick can realize thinning of the other portion and can realize weight reduction, and it can be said that the spatial degree of freedom is improved for the thin portion.

Although the load side has been described, as in the upper mold A for the seal on the counter load side, the lower mold B can exert the same effect by the same action as the seal member 15 and the axial end surface 13a of the thick portion.

In particular, in the present embodiment, the mold resin 10 integrally molds the conducting wire 30 together with the stator and the like and the resin goes around to a part or the whole of the pull-out port 33, and it can be said that it is possible to sufficiently integrally mold the stator 12 and components constituting the stator 12 and to prevent leakage of the mold resin 10, and the remarkable effect can be achieved by reliability or the like.

The above is embodiment 1 for carrying out the present invention. According to embodiment 1, it is possible to improve performance, durability, reliability, workability, or the like of the motor 100.

Embodiment 2

Hereinafter, embodiment 2 will be described. The main difference between embodiment 2 and embodiment 1 is the following two points.

First, the upper mold does not have a groove on the outer peripheral side facing the stator, the outer peripheral angle is a stepped portion, and the seal member is arranged on the stepped portion.

Second, in embodiment 1, the conducting wire drawn out from the core unit is disposed so as to protrude toward the counter load side in the axial direction from the stator, and in second embodiment, the pull-out port is arranged at a position in the radial projection plane of the stator, and the mold resin 10 and the stator 12 are integrally wrapped around therewith.

In the following description, the same reference numerals are used for the members having the same action and effect as those in embodiment 1, and the detailed description thereof may be omitted in some cases.

Figure 8A:
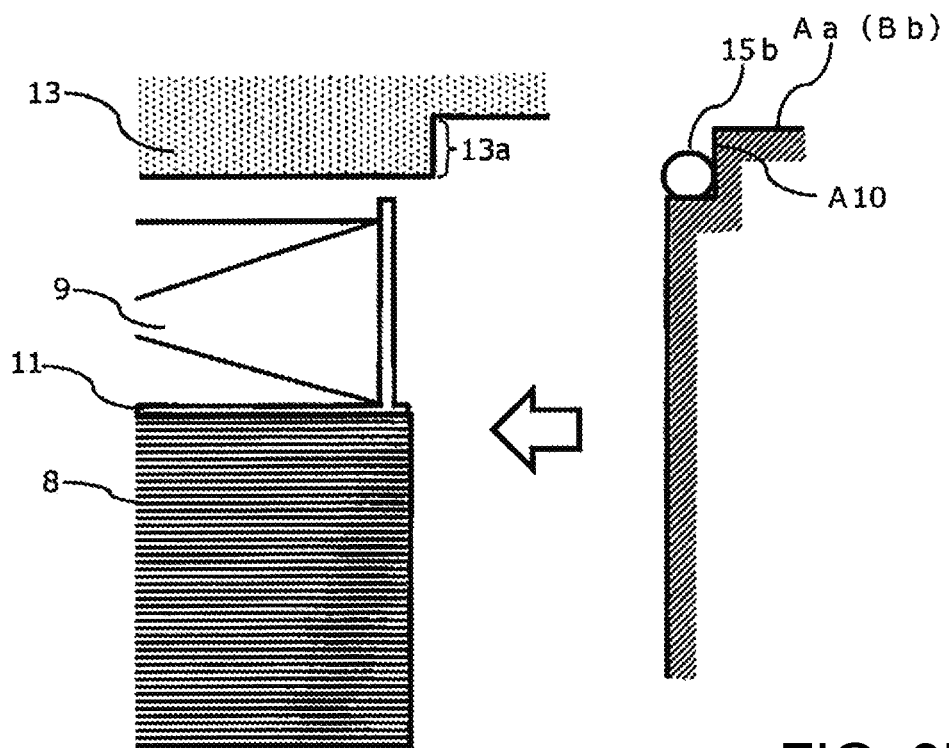
FIGS. 8A and 8B show state transition diagrams schematically illustrating deformation of a seal member in a resin molding process of an axial gap type motor according to embodiment 2 to which the present invention is applied.

FIG. 8 schematically illustrates a partial enlarged cross-section of the upper mold Aa (the same applies to the lower mold Ba) and the seal member 15b according to embodiment 2. As illustrated in FIG. 8(a), the outer peripheral angle of the upper mold Aa on the stator 12 side has a stepped portion A10. The axial dimension (width) of the stepped portion A10 may be greater than, equal to, or smaller than the cross-sectional diameter of the seal member 15b. The radial dimension (width) of the stepped portion A10 is preferably smaller than the cross-sectional diameter of the seal member 15b. The seal member 15b is an elastic member having a larger cross-sectional diameter than that of the seal member 15b of embodiment 1.

Figure 8B:
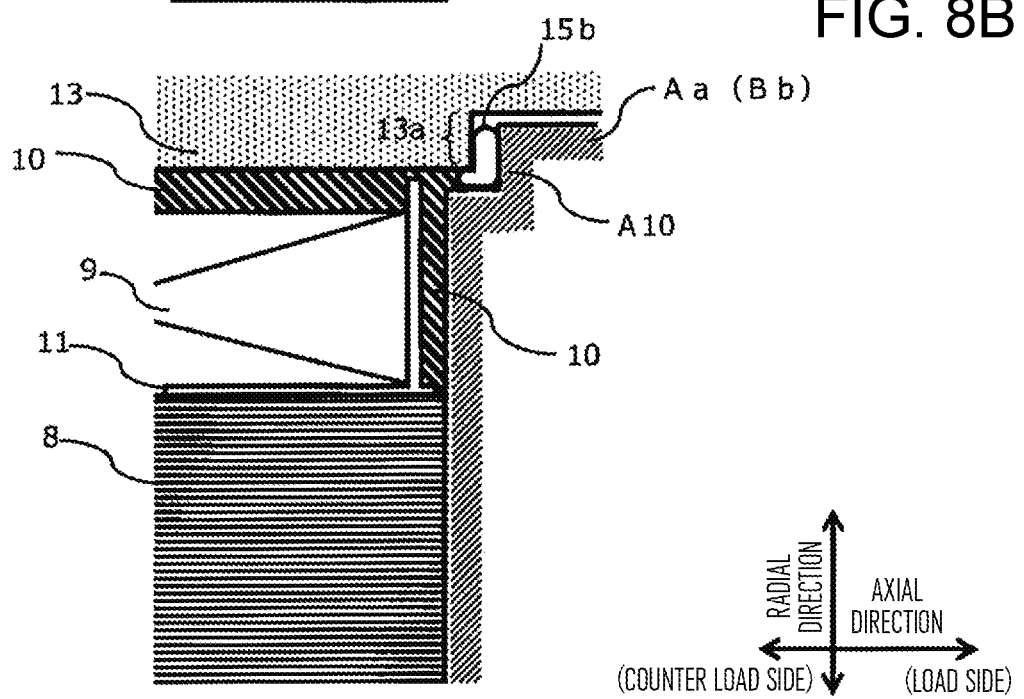

As illustrated in FIG. 8(b), the upper mold Aa enters the inner cylinder of the housing 1, and eventually the seal member 15b abuts against the axial end surface 13a of the thick portion 13. The seal member 15b is deformed so as to spread toward the axial central side and the outer peripheral side by pressing. Here, in the present embodiment, the upper mold Aa on the axial central side of the stepped portion A10 enters a position slightly shorter than the axial dimension of the thick portion 13. With this configuration, the seal member 15b deforms more complicatedly between the axial end surface 13a of the thick portion and the stepped portion A10. In the example shown in FIG. 8(b), a part of the deformed seal member 15b deforms and advances toward the traveling direction side of the upper mold Aa and positively generates the sealing action.

Figure 9:
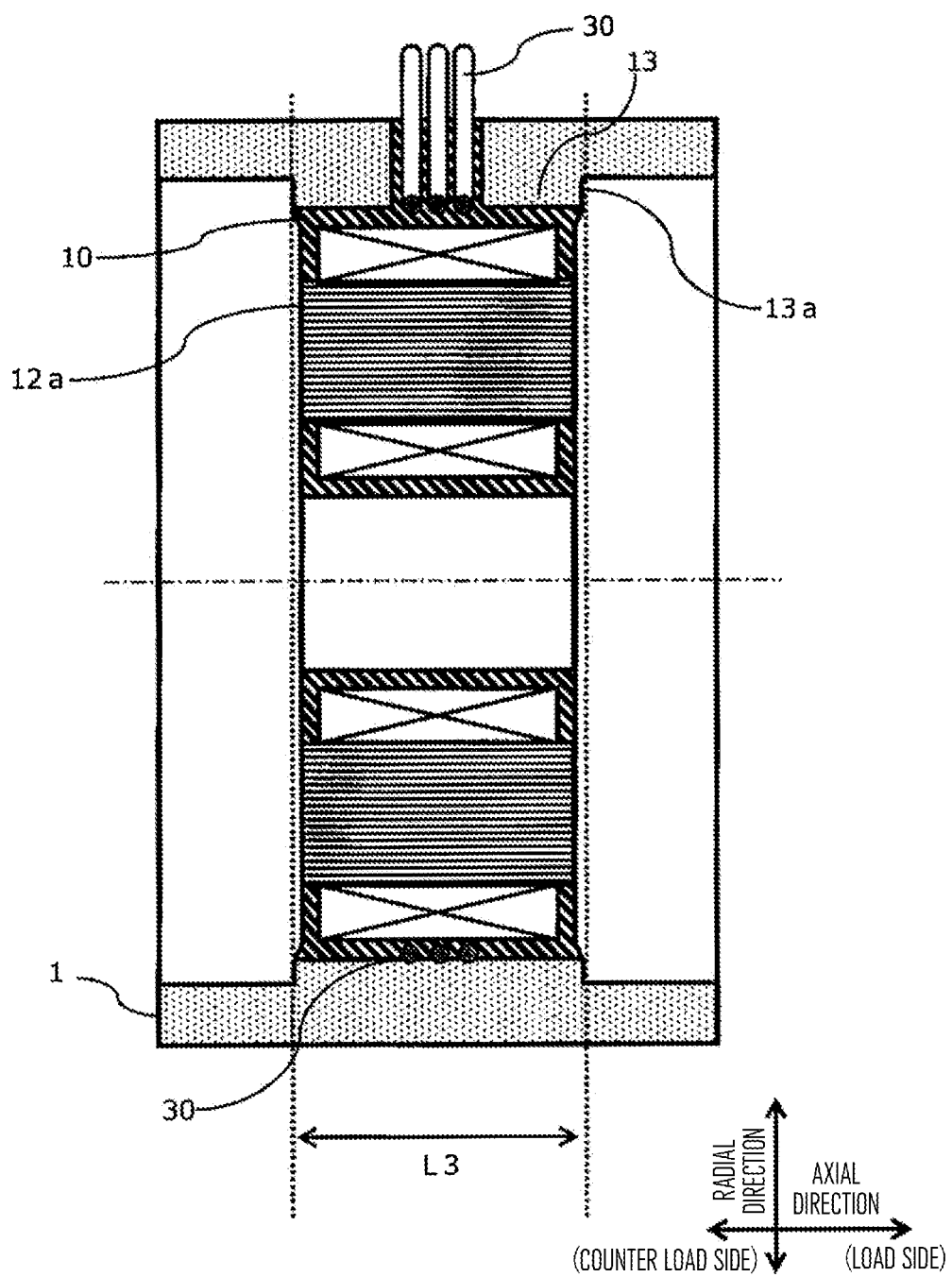
FIG. 9 shows a longitudinal sectional view schematically illustrating an aspect after the resin molding process of the axial gap type motor according to embodiment 2.

After the step of sealing the mold resin 10 in FIG. 8(b), the axial longitudinal cross-sections of the stator 12, the mold resin 10, and the housing 1 in the state in which each resin mold is removed from the housing 1 are schematically illustrated in FIG. 9. The boundary between the mold resin 10 and the axial end surface 13a of the thick portion on the inner peripheral surface of the housing is not positioned outside the axial end surface 13b on both the load side and the counter load side (fitted within length of L3). In other words, the boundary may be positioned more axially inward (the stator 12 side) from the axial side corner of the axial end surface 13a.

In addition, the stator 12 and the mold resin 10 are included within the radial projection plane of the thick portion 13. That is, the resin burr that leaks out along the inner periphery of the housing and sticks to the thin wall does not occur. Further, the housing portion to which the high pressure load is applied at the time of molding is only the thick portion 13, thereby promoting wrapping around the mold resin 10 with high pressure resistance. Therefore, it can be said that it contributes to improvement of the performance, reliability, durability, and workability of the motor 100.

[Modification]

Although embodiments 1 and 2 have been described above, modifications of the seal member 15 (15b) or the thick portion 13 of the housing 1 will be described with reference to FIGS. 10 and 11.

Various configurations of the upper mold (or the lower mold), the thick portion, and the seal member are illustrated in FIG. 10.

Figure 10A:
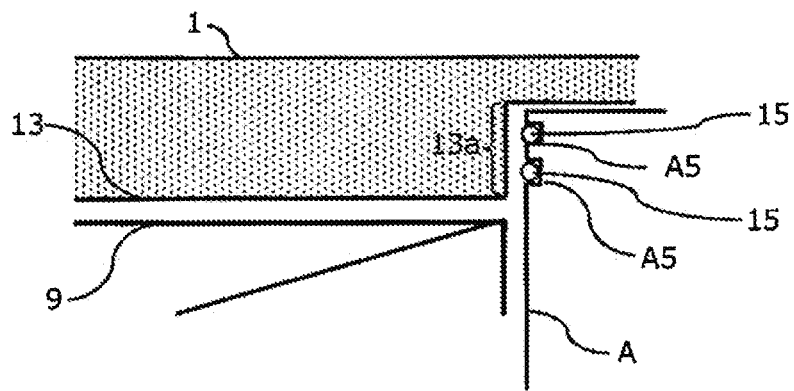
FIGS. 10A to 10C show longitudinal sectional views schematically illustrating a configuration of a thick portion, a seal member, and a resin mold of an axial gap type motor according to a modification to which the present invention is applied.

In FIG. 10(a), the upper mold A has a plurality of (two in the drawing) grooves A5 as illustrated in embodiment 1, and the seal member 15 is disposed in each of the grooves A5. The plurality of grooves A5 are in a relationship in which the diameters are different from those of the adjacent grooves A5 on the axial central side and the grooves A5 adjacent to the axial central side are included. Along with this, the diameters of the seal members 15 disposed in the seal members 15 also have the same relationship. It can be said that the sealing property is secured and improved by the presence of the plurality of seal members 15.

Figure 10B:
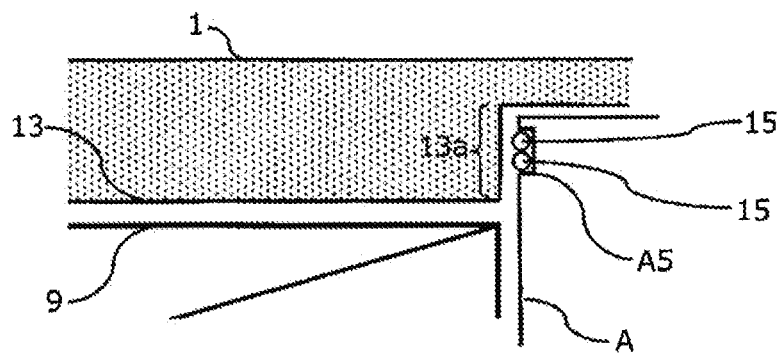

In FIG. 10(b), although there is one groove A5 of the upper mold A, it is characterized in that a plurality of seal members 15 are arranged continuously in such a manner that one is enclosed on the axis side in the other. Even with such a configuration, the sealing property can be secured and improved.

Figure 10C:
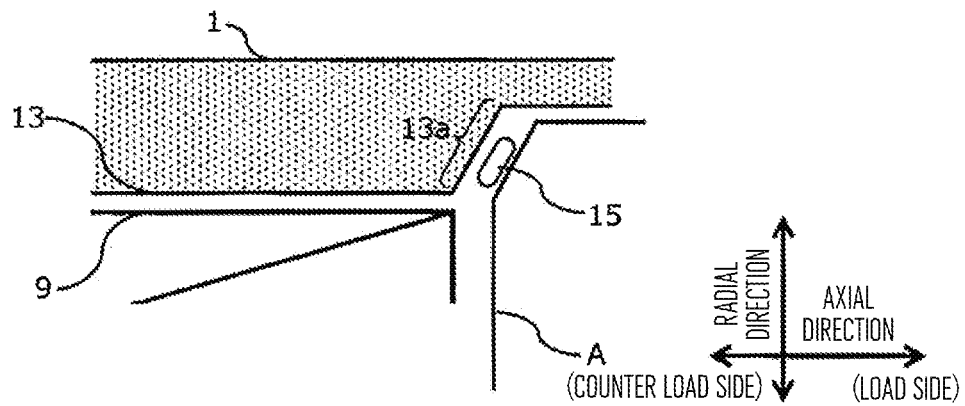

FIG. 10(c) illustrates a state in which the axial end surface 13a of the thick portion is tapered to be inclined in the approaching direction of the upper mold A (or the lower mold B). That is, in embodiment 1 and the like, the axial end surface 13a is an example configured with a stepped surface that becomes vertical toward the axial center, but the present modification is a configuration example that becomes a step that is inclined toward the axial central side. In addition, the outer peripheral side corner of the upper mold A also has an opposite tapered shape so as to follow the axial end surface 13a. The seal member 15 is disposed between the axial end surface 13a in such a fitting relationship and the outer peripheral angle of the upper mold A. As in the other examples, the shaper of the seal member 15 may be a circle in a cross-section or a plate annular body as illustrated in FIG. 10(c). Even with such a configuration, the sealing performance can be improved.

Figure 11:
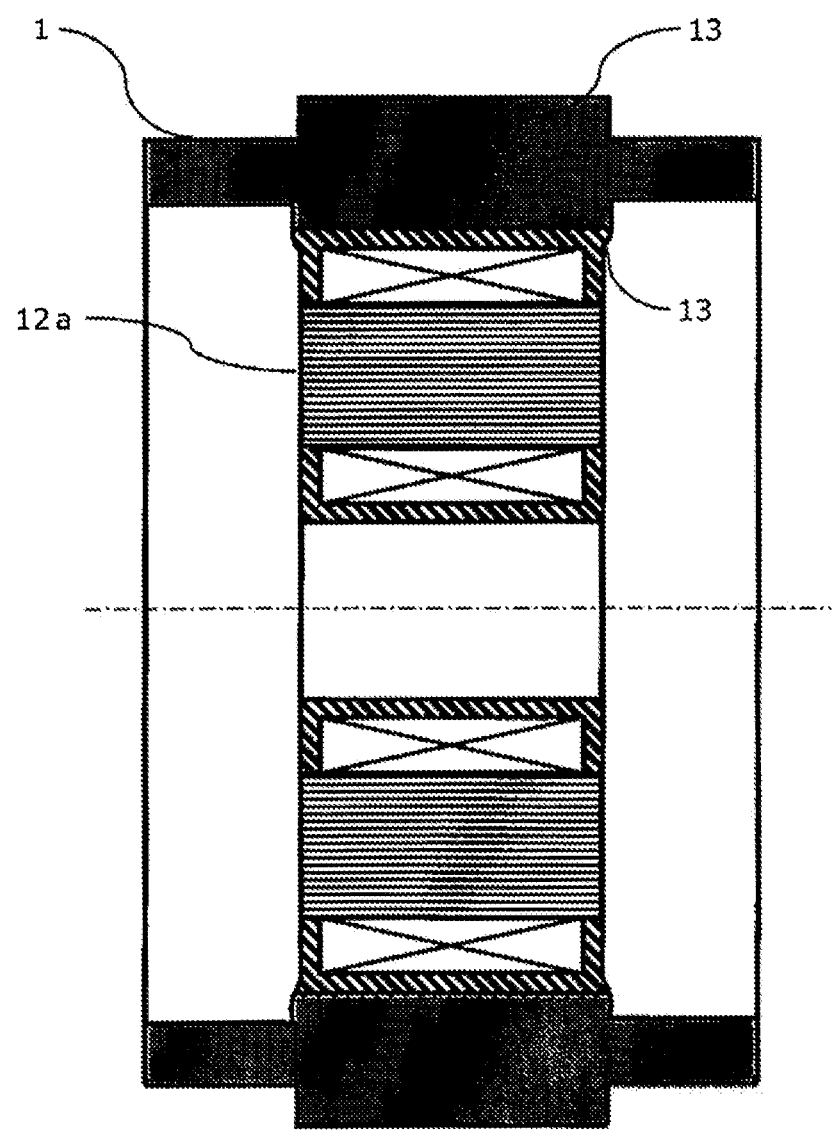
FIG. 11 shows a longitudinal sectional view schematically illustrating a configuration of a housing of an axial gap type motor according to a modification to which the present invention is applied.

A modification of the thick portion 13 of the housing 1 is illustrated in FIG. 11. In the above example, the thick portion has a thickness from the cylindrical wall of the housing 1 toward the axial central side, but in this modification, the thick portion is thick not only on the axial central side but also on the outer peripheral side. For example, it is a preferable shape in the case of further increasing the sealing pressure of the resin or in the case of further foiling other than the pressure resistant portion of housing 1. Further, if the thickness of the thick portion 13 on the axial central side is made thinner, the diameter of the stator 12 and the like can be increased accordingly. In order to secure the insufficient pressure resistance strength, it is also possible to bring the thick portion 13 to the outer peripheral side.

FIG. 11 schematically illustrates a longitudinal sectional view of a housing 1, a stator 12, and a mold resin 10 according to a modification. One of the features of the present modification is that the thick portion 13 is thick not only on the axial central side but also on the outer peripheral side.

Although various examples for implementing the present invention have been described above, the present invention is not limited to the above-described configuration and the like, and various configurations can be adopted without departing from the gist thereof. A part or the whole of the configuration in one embodiment can be applied to the configuration of the other embodiment, and it is also possible to omit a part of the configuration.

In particular, in the above-mentioned embodiments and the like, although it is exemplified that sealing is performed by the axial end surface 13a (stepped portion) and the seal member 10 on both the load side and the counter load side, such a configuration may be applied to only one of them.

In addition, in the above-described embodiments, the application to the permanent magnet type motor has been described, but it can be applied to an induction type motor, and it can be applied not only to the motor but also to the power generator.

REFERENCE SIGNS LIST 1 housing
2 bracket 3 bearing
4 rotational shaft
5 permanent magnet
6 back yoke (base)
7 rotor
8 core
9 coil
10 mold resin
11 bobbin
12 stator
12a core unit
13 thick portion
13a axial end surface (of thick portion)
14 connection member
15, 15b seal member
30 conducting wire (wiring, leading wire)
31 conducting wire holding member
33 pull-out port
A, Aa upper mold
A5, B5 groove
A10, B, Bb lower mold
C middle mold
L1 axial width dimension (of thick portion)
L2 axial width dimension (of stator)
L3 axial width dimension of boundary (between mold resin and thick portion)
100 axial gap motor (motor)

The invention claimed is:

1. A method for manufacturing an axial gap type rotating electric machine including:
a stator in which a plurality of core units each having a magnetic flux surface in a rotation shaft direction are arranged annularly around a rotational axis; a rotor that faces the magnetic flux surface of the stator in an axial direction; a housing having an inner cylindrical space for storing the stator; wherein the housing has an annular thick portion along a part of the inner periphery of the inner cylinder space with a predetermined thickness toward an axial center along the inner periphery, and a mold resin covering a part or a whole of the stator and integrally connecting the stator and the inner periphery of the inner cylindrical space, the method comprising:
an arranging step of arranging the stator in the inner cylinder space at a position including an axial width of the stator within an axial width of the thick portion;
a seal member arranging step of arranging an annular seal member so as to face an axial end portion of the thick portion, the seal member having an inner diameter substantially coinciding with an inner diameter of the axial end portion of the thick portion and having a shape changing in a radial direction by pressing from the axial direction;
a pressing step of inserting the resin mold having an outer diameter larger than an inner diameter of the thick portion from an axial opening of the inner cylinder space and pressing the seal member against the axial end portion; and
a sealing step of sealing the mold resin from a resin sealing port of the resin mold on the stator side and integrally molding the stator and the inner periphery of the thick portion.

2. The method for manufacturing the axial gap type rotating electric machine according to claim 1, wherein the pressing step comprises a pressing step of pressing the seal member in the axial direction until a deformed end of the seal member in the axial center direction reaches a range from an axial side corner of an axial end surface of the thick portion to an axial center side.

3. The method for manufacturing the axial gap type rotating electric machine according to claim 1, wherein the seal member arranging step comprises a step of arranging the seal member in an annular groove positioned on a surface of the resin mold opposed to an axial end portion of the thick portion.

4. The method for manufacturing the axial gap type rotating electric machine according to claim 1, wherein the seal member arranging step comprises a step of associating a plurality of seal members with the axial end portion, the plurality of seal member being included in the radial width of the axial end portion of the thick portion, having different diameters, and having a relationship in which one adjacent seal member is enclosed in the other seal member in the axial direction.

5. The method for manufacturing the axial gap type rotating electric machine according to claim 1, wherein the seal member is made of a member having a hardness lower than a hardness of at least the axial end portion.

6. The method for manufacturing the axial gap type rotating electric machine according to claim 1, wherein the seal member is an elastic body made of a rubber or a resin.

* * * * *